United States Patent [19]
Griem, Jr.

[11] 3,763,362
[45] Oct. 2, 1973

[54] METHOD OF AND APPARATUS FOR CONDITIONING SIGNALS

[75] Inventor: Paul D. Griem, Jr., Medway, Mass.

[73] Assignee: Owens-Corning Fiberglas Corporation, Toledo, Ohio

[22] Filed: Mar. 7, 1972

[21] Appl. No.: 232,368

Related U.S. Application Data

[60] Continuation of Ser. No. 74,183, Sept. 21, 1970, which is a continuation of Ser. No. 844,688, April 14, 1969, which is a division of Ser. No. 563,112, July 6, 1966, Pat. No. 3,471,278.

[52] U.S. Cl............................ 235/151.31, 235/152
[51] Int. Cl............................................. G08c 13/00
[58] Field of Search.......................... 328/165, 151; 235/152, 151.31

[56] References Cited
UNITED STATES PATENTS
3,518,414  6/1970  Goodman et al.................. 235/164

Primary Examiner—Eugene G. Botz
Attorney—Myron E. Click et al.

[57] ABSTRACT

Preferred embodiments of the invention disclosed herein include a method of operating an automatic computing system to condition signals, for example to reduce transients and other noise, and apparatus for carrying out the method. The method includes detecting successive changes in a signal in one direction, limiting the changes to small amounts initially, and increasing the change limit permitted in response to sustained successive changes in the same direction.

26 Claims, 7 Drawing Figures 3,763,362

METHOD OF AND APPARATUS FOR CONDITIONING SIGNALS

This is a continuation of copending application Ser. No. 74,183, filed Sept. 21, 1970; which was copending with and a continuation of Ser. No. 844,688, filed Apr. 14, 1969; which was copending with and a division of Ser. No. 563,112, filed July 6, 1966, and issued on Oct. 7, 1969 as U. S. Pat. No. 3,471,278.

This invention relates to a method of and apparatus for conditioning signals, as by reducing or removing transients, interference and other noise from electrical signals in control apparatus producing fibers.

As the instrumentation approach in measurement and control of variables, apparatus, and processes has grown more sophisticated, the requirements for accuracy in such instrumentation approaches have also increased to provide a closer quality check on the goods being produced and on the processes being used. The drive to refine control components has reulted in improved reliability, enhanced accuracy, and components generally capable of providing quick, complete responses to an input signal. The improved and more sensitive process control equipment has led to better products and processes.

Improvements in such process equipment reaches a point of diminishing returns if the input signals to the equipment cannot be adequately conditioned to provide the equipment with the initial accuracy and the freedom from noise and other interference to perform the control functions. For example, it is well known that thermoplastic materials such as glass can be drawn into continuous fibers by attenuation of streams from a feeder associated with the molten body of this material. The flowing material is attenuated in the process into individual fibers which are usually gathered into a strand under the influence of pulling forces exerted by a winder which collects the strands into a package. In manufacturing fibers in this manner, the goal has been to produce fibers which are very closely similar in diameter and individual fibers of uniform diameter throughout their lengths. If production of fibers of such uniformity could be attained, the strand yardage per pound of glass supplied from the feeder would be consistently uniform and much would be done to promote consumer reliance upon the product quality when strand or fiber diameters are specified.

On collection of strands into a package, however, a gradual build-up of the package occurs in the usual packaging cycle of, for example, 6 to 30 minutes, such that for a given speed of the collection tube, the linear speed of attenuation is in effect gradually and substantially uniformly increased to a maximum linear speed toward the end of the packaging cycle. In other words, at the start of a packaging cycle, the linear speed of attenuation of the fiber from a feeder is determined by the outer diameter of the bare collection tube, but as the build-up of the package occures, the speed of attenuation instead becomes dependent upon the outer diameter of the top layers of strand in the package. When viewed on an overall basis, the linear speed of attenuation increases gradually from a minimum at the beginning of a packaging cycle to a maximum at the end of a packaging cycle when the package is completed. Under fixed conditions of temperature of the glass supplied from the feeder, the diameter of fibers collected into the strands being wound is correspondingly also varied dependent upon whether it collected at the beginning or the end of the package.

It has been discovered that when one of the fiber-forming factors such as the temperature of the thermoplastic material emitted from the feeder or the rotational speed of the winder which collects the strand into a package is programmed or varied at a patterned rate matched to the variation in linear speed of attenuation, that the fiber diameter can be maintained more exactingly uniform. When utilizing such variable conditions as control factors, such as glass temperature or winding speed, it then becomes incumbent upon the control apparatus to do so with a highest degree of accuracy possible in order to attain the best result.

Since electrical interference or occasional failures in the input-measuring section of a central processiong unit can cause incorrect readings an improved electrical signal filter is required. The change of any input on successive readings should be limited so that noise is filtered out but real input changes pass through. The input signal should be "read" faster than its rate of change. Real input changes would be present on several successive readings. Interference or noise is usually transient, and will normally not be present after two or three successive readings. Therefore, if the input reading suddenly changes by a large amount, the filter should severely limit the change for the first two or three readings on the assumption that this change is only noise. If the change is still present after this time, it must be a real input change, and the filter should open rapidly and pass the change through to the central processing unit, computer, etc.

Previous filters performed this function only when the input is close to a setpoint. For example, the amount that the input may change on successive readings is equal to the minimum limit or the control error, whichever is greater. So the minimum limit is applied only when the input value is near the setpoint even though noise may occur for any value of input.

Accordingly, it is an object of this invention to provide improved filtering apparatus which is adapted to pass an input signal with a minimum amount of transients, noise, or other interference.

It is a further object of this invention to provide an improved method of and apparatus for filtering input signals so that the change of any input on successive readings severely limits transients but allows real input changes to pass through.

It is a still further object of this invention to provide method and apparatus for filtering electrical signals which severely limits transient noise but responds to sustained input changes, regardless of the setpoint value in the processes; the filtering apparatus closing on transient or oscillatory input changes and opening for successive readings of a change in one direction.

Another object of this invention is to provide an improved method of and apparatus for filtering electrical signals in which the rate of limit increase may be arithmetical, geometrical, or which may be made asymmetrical. An asymmetrical filter constructed according to this invention may change the limits differently in response to an input increase than in response to an input decrease.

An additional object of this invention is to provide an improved filter method and apparatus in combination with central processing and related equipment to produce improved continuous fibers from thermoplastic materials by attenuation of streams of said material from a molten body thereof.

In effecting the above objects, the invention features a method of filtering transients and other noise from an electrical signal which comprises the steps of measuring successive changes in the electrical signal, detecting the direction of the changes, limiting a first change in one direction to a predetermined minimum amount, and increasing the limit from the minimum limit amount in predetermined steps as corresponding successive changes in the same direction occur. Further, the method may include comparing the present limit step with the corresponding present change, increasing the present limit if the corresponding change is larger, and decreasing the present limit if the corresponding change is smaller. The present limit may be compared with the minimum limit if the corresponding change is smaller than the present limit, the present limit may be decreased if the present limit is larger than the minimum limit, and the minimum limit may be used as the next limit if the present limit does not exceed the minimum limit.

Still further, the method may include the steps of comparing a corresponding change with the minimum limit, increasing the minimum limit if the corresponding change exceeds the minimum limit, and using the minimum limit as the next limit if the corresponding change does not exceed the minimum limit. In addition, the method may include the step of applying the minimum limit a plurality of times to successive changes in one direction of the electrical signal before increasing the minimum limit amount in predetermined steps. A maximum limit may be provided which may not be exceeded.

Apparatus for carrying out the above method as shown and disclosed herein may comprise means for receiving a raw input signal and means for measuring a change in the input signal. First means are utilized for comparing the change to a predetermined present change limit. Means responsive to the first comparing means may be utilized for passing the raw input signal when the measured change is less than the present limit. Means also responsive to the first comparing means is used for passing the input signal up to the present limit and for increasing the present limit to a second predetermined value for future comparison when the change exceeds the present limit. Means are shown for detecting the direction of change of the input signal. Means responsive to the direction detecting means limits the change in the input signal to a predetermined minimum limit when the signal changes direction. Second means responsive to the first comparison means compares the present limit to the minimum limit when a change is less than the present limit and reduces the present limit to another predetermined value not less than the minimum limit for future comparison.

In its most specific form the invention features the combination of the apparatus shown to produce a plurality of fibers each having the same diameter and individual fibers having the same diameter throughout their length.

Other objects, advantages and features of this invention will become apparent when the following decription is taken in conjunction with the accompanying drawings, in which.

Although the invention is herein exemplified in specific detail by reference to glass fiber production, it will be apparent in view of the disclosure that it has application to production of fibers of other materials as well. Further, although the variable conditions shown as subjects of measurement and control are specific uses of the filtering apparatus herein disclosed, it is to be noted that all embodiments are illustrative only and not limiting in any sense with the respective apparatus, process, product or other use of the invention as disclosed herein.

Figure 1:
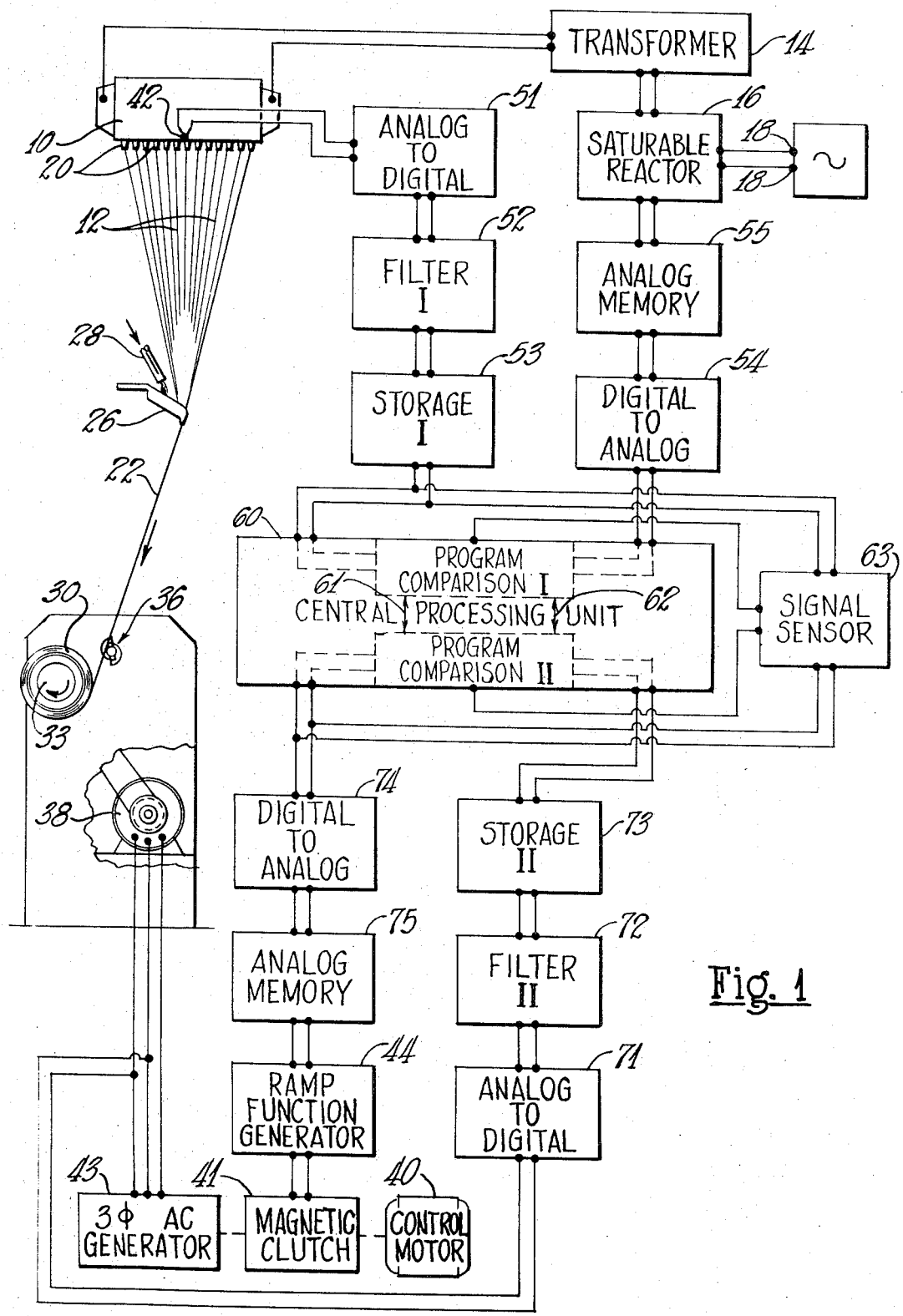
FIG. 1 shows a general layout of apparatus and process control for producing continuous glass fibers.

Referring now to FIG. 1, there is shown a molten glass container, textile bushing or feeder 10 for forming textile fibers 12 from molten glass. The molten glass may be maintained at a preset operating temperature when the fiber forming process begins and then cooled to increase the viscosity and thus offset the increase in the diameter of the fibers as the package 30 increases in size and as the linear speed of attenuation increases. The operating temperature is maintained within the desired range by direct passage through the feeder 10 of electrical current supplied from a transformer 14 which is energized in response to control of a saturable core reactor 16 or other suitable electrical current control apparatus, such as silicon controlled rectifiers, connected to power supply terminals 18.

The textile fibers 12 are formed of the molten glass fed through orifices 20 in the bottom of the feeder 10. The fibers 12 are gathered together into a strand 22 by passage of the fibers over a gathering member 26 in a manner well known in the art. The fibers are supplied with sizing fluid at the gathering member 26 from a supply tube 28 communicating with the source of sizing fluid in a known manner, but not shown here. Other means of applying a sizing to the fibers may be utilized. The successively formed portions of the strand 22 are wound upon a package 30 of a collet 33 of a winder unit 32 as the strand 22 is caused to traverse the package 30 by a spiral wire-type traverse mechanism 36.

The feeder 10 may receive glass marbles which are heated into molten form by the secondary single loop winding of the transformer 14 or the feeder 10 may receive glass already in a molten condition from a furnace, not shown. The heating current for the feeder 10 may be derived from alternating current supplied to the terminals 18, for example, from a 440 volt 60 cycle source.

The programming system includes an electrical circuit having at least one heat sensor or thermocouple 42 connected through control units for maintaining the temperature of the feeder 10. The thermocouple 42 which may be illustrative of a plurality of thermocouples senses the temperature of the feeder 10. The signal may be amplified and, in this instance, is transformed to a digital state by the analog to digital converter 51. Filter apparatus 52, which will be shown in greater detail hereinafter, filters the transient and other noise from the signal from thermocouple 42 and stores the signal in storage unit 53. The central processing unit 60 senses the stored signal in storage unit 53, coordinates the process and sends a correction signal through the digital to analog converter 54 after which it is stored in an analog memory 55. The correction signal stored in analog memory 55 is utilized by the current controller 16 to control the amount of current supplied to the transformer 14 and thus the heat generated in feeder 10.

A further arrangement is provided which is adapted to assist in attaining uniform fiber diameters by attenuation of the plurality of fibers at a constant linear speed from a feeder. The constant linear speed of attenuation is accomplished in this instance by programming the speed of the winder motor 38 which drives the collect 33 having the package 30 thereon in accordance with the rate of build-up of the package being wound on the collet. The winder motor 38, for the purposes of this embodiment, may be a frequency responsive, variable speed motor. Motor speed control means includes a control motor 40 driving a three phase A.C. generator 43 via a magnetic clutch 41, and a ramp function generator 44 controlling the magnetic clutch connection between the control motor 40 and the three phase generator 43. The control motor 40 is preferably a constant speed synchronous motor. The magnetic clutch 41 is advantageously adjustable in slip in response to preselected program signals from the ramp function generator 44. The ramp function generator 44 provides program signals to effect ramp function control of the winder motor 38.

To insure that the winder motor 38 is being driven at the desired speed, there is provided frequency sensing and measuring means for supplying frequency signals corresponding to the speed of the motor 38. The frequency generated by the A.C. generator 43 is sampled through the analog to digital converter 71, filtered by the filter unit 72 to be described hereinafter, and stored in the storage unit 73. The central processing unit 60 compares the frequency signal sampled with a programmed frequency to check the accuracy of the ramp function being generated by generator 44. If the actual speed, according to the frequency sampled, is in error from that required or desired, the control process unit 60 generates a correction signal which is passed through a digital to analog converter 74 and stored in an analog memory 75 for use by the generator 44. The ramp function generator 44 is thus corrected to provide the desired speed via the magnetic clutch 41.

The central processing unit 60 may control the temperature of the feeder 10 and the speed of the winder motor 38 as separate functions, but preferably correlates the information received from each function in order to attain the most exact uniform fiber diameter from the feeder 10. That is, while the temperature of the feeder 10 can be controlled over the range of heating during the packaging cycle with a great degree of accuracy by use of the filter means 52 to remove transients and interference from input signals received from the thermocouple 42, the speed of response of temperature change in the feeder is somewhat slower to correction signals than the speed of response of the winder motor 38 to correction signals to maintain the fiber diameter uniform. Thus, the temperature range control may be used as a more coarse control, while the winder motor speed control may be used as a vernier control to provide finer and faster adjustments in the process to attain exact diameters of fibers.

In addition, since the use of the novel filtering method and apparatus herein provides more accurate sensing of signals to be fed to the control apparatus, either function may be controlled more closely than heretofore. Therefore, either the temperature control or the winder motor speed control may take over control of the whole process in response to the failure, erratic behavior, etc., of the other control and still provide fibers of more uniform diameter than previously possible.

Since the fastest and most accurate means for accomplishing the process control for the unit 60 is a digital computer the signals acquired from the thermocouple means 42 and from the frequency sampling means are converted from their analog mode to digital before feeding to the central processing unit 60. After correction or after the central process has completed its analysis, the resultant signal is reconverted from digital to analog and stored for use if not applied at the time of conversion. Since most process units 60 are units or computers utilizing digital information, the preferred embodiment of the filter apparatus described hereinafter has been constructed to utilize digital information received from an analog to digital converter. It should be noted, however, that limit selection according to the method disclosed hereinafter may be accomplished via analog equipment. However, analog equipment normally is not as fast in response time nor as accurate as the digital computing equipment and thus the digital apparatus arrangement as illustrated herein is preferable.

Figure 2:
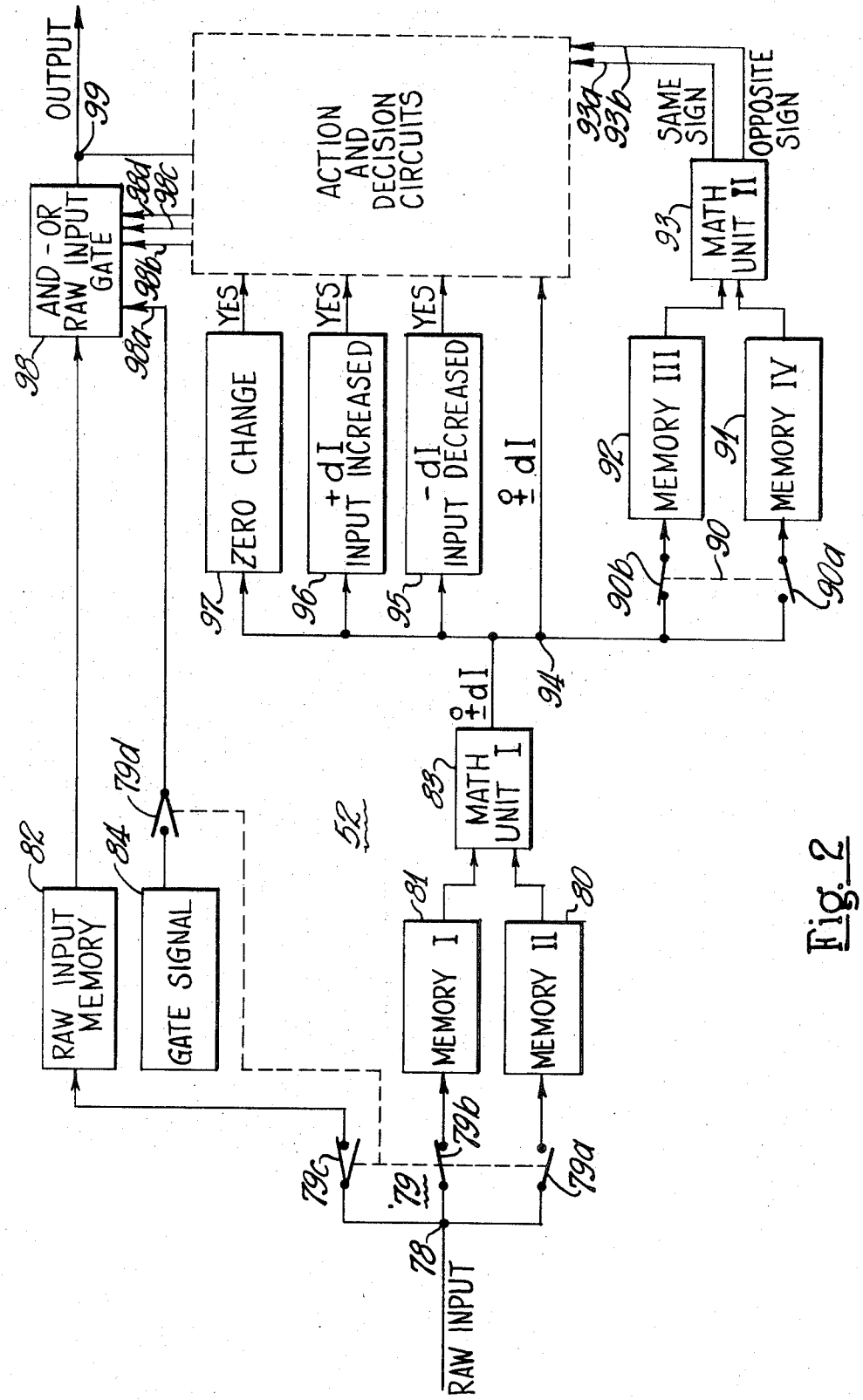
FIG. 2 is a block circuit diagram of apparatus for filtering an input signal to the central process control in accordance with the teachings of this invention.

Referring to FIG. 2, there is illustrated in block diagram form circuits for making decisions, storing information and taking the action as required for a filter apparatus according to the teachings of this invention. A raw input signal is received at the terminal 78. The signal received is stored in the raw input memory 82. The signal received is also stored in the raw input memory unit 81 where it is to be compared with a previously sampled signal that has been stored in memory unit 80. The stored samples are compared by math unit 83 which provides an output representing the difference in magnitude of the two successively sampled signals and therefore denoting a change, if any. That is, a zero signal appears if at the output of math unit 83 there has been no change. A positive dI, or a negative dI is supplied from the output of the math unit 83 reflecting the magnitude and direction or sign of the change if there has been a change.

Switching means indicated generally at 79 and including switches 19a, 79b, 79c, and 79d are representative of switching operations that will take place in the various circuits as required, such switching operations being well known in the art. For example, switching means 79a and 79b represent the feeding of a signal for storage to the one of memory units 80, 81 which has its switch closed while the opening of the switch to the other memory unit represents an isolating of the raw input signal from that unit. Similarly, switching means 79c gates a sample signal to the raw input memory 82 and precludes a change in the stored signal until a decision has been made with respect to the stored signal.

Switching means 79d represents switching means for connecting a gating signals to an AND–OR raw input gate 98. In operation, the gate 98 will allow the signal stored in the raw input memory 82 to be gated to the output terminal 99 upon the coincidence of a signal from the gate signal means 84 via switching means 79d to lead 98a and a signal present on any one of the three remaining leads 98b, or 98c or 98d. Operation of the switching means 79 from one state to another state indicates that the filter apparatus has concluded its operation on the last sample and is ready to and is sampling the next successive condition or state of the input signal.

Memory units 91 and 92 are connected to successive dI changes via switching means 90, having respective switches 90a and 90b operative in the same manner as switching means 79a and 79b to store the changes calculated by the math unit 83 on successive samplings of the input signal. A math unit 93 compares the dI changes stored in memory units 91 and 92 and provides an output on 93a if the previous change was of the same sign or in the same direction as the last change, and provides an output on 93b if the previous change was of the opposite sign or in another direction from the last change. Therefore, memory units 91 and 92, and math unit 93 operate as a direction detecting circuit for successive changes in the input signal.

Terminal 94 provides a connecting point for a signal, which is the same as or proportional to the actual magnitude of the change of the input, for use in later action and decision circuits. Circuit 95 provides a signal output in response to a negative dI or input decrease change received at its input terminal. Circuit 96 provides a signal output in response to a positive dI or an input increase change received at its input terminal. Circuit 97 provides an output signal in response to a zero input received at its input terminal.

Figure 3:
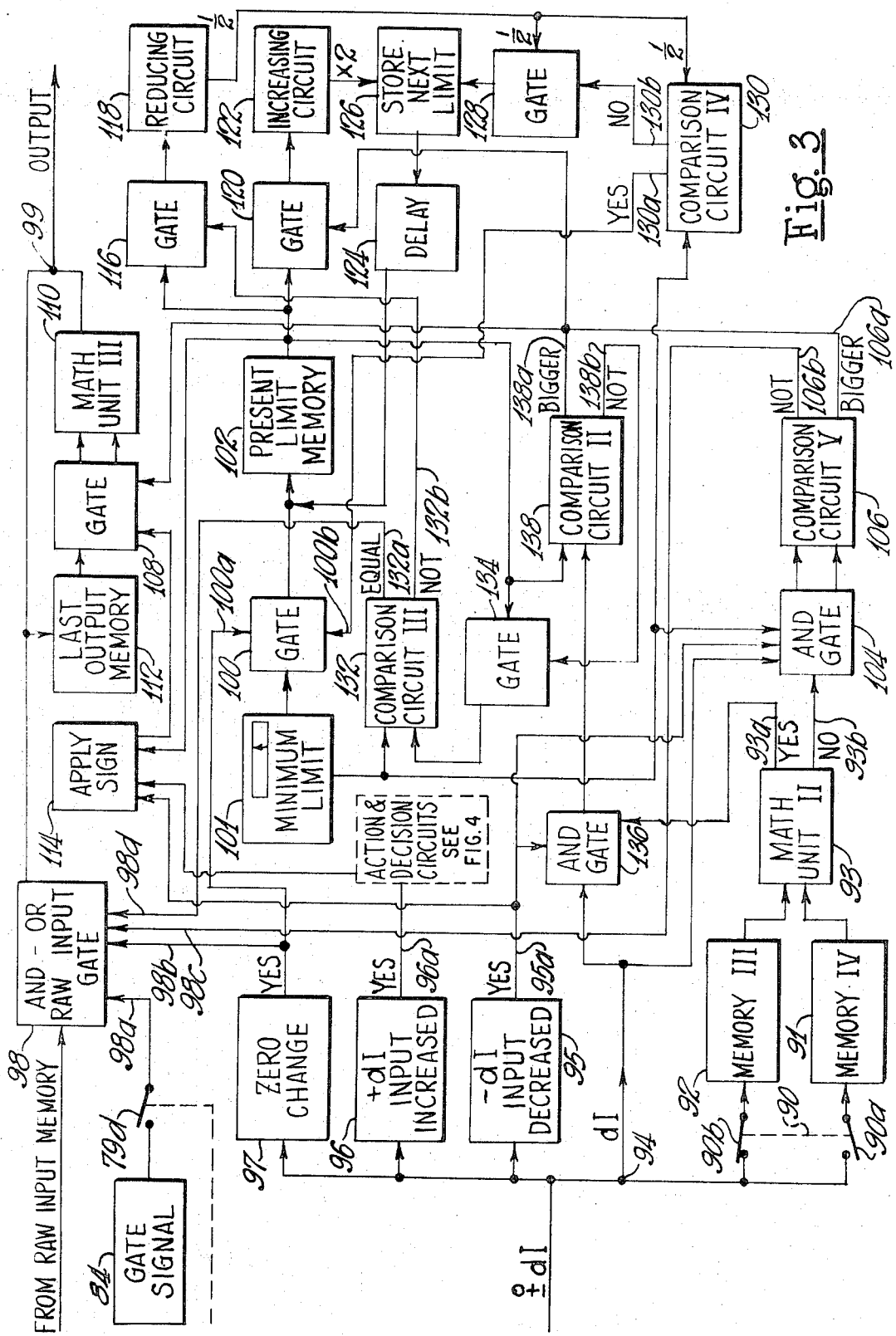
FIG. 3 is a block circuit diagram of apparatus for providing limits for signals which are decreasing.

Referring to FIG. 3, there is illustrated apparatus for providing limits as desired for a zero change and for a negative change in the dI detected at terminal 94. If a zero change is noted, zero change circuit 97 provides an output to lead 98b which gates the raw input memory 82 through gate 98 to the output terminal 99. Since no change has been recorded, no limit is applied to the raw input signal. In addition, the output signal from the zero change circuit 97 is delivered to one terminal of an OR gate circuit 100. A predetermined minimum limit has been preset in circuit 101 to be gated through gate 100 to a present limit memory 102. In response to a signal on either lead 100a or lead 100b, circuit 100 gates the predetermined minimum limit to the present limit memory 102 where it is stored to be applied if required after the next sampling of the raw input signal at 78.

Assume that the dI received at terminal 94 is negative. An output thus appears from the negative dI circuit 95. The direction detection unit of memory units 91, 92 and the math unit 93 determines whether or not a previous change was negative. If the sign of the preceding change is different (zero or positive) from the present negative change an output is received on lead 93b which is delivered to AND gate 104. Upon a coincidence of signals at the AND gate 104 from the negative dI circuit 95 and lead 93b, the value of the minimum limit from circuit 101 and the value of the present negative dI change is gated to a comparison circuit 106.

If the negative dI change in this instance is greater than the minimum limit, an output appears on lead 106a. The output on 106a is operative to open gate 108. The previous or last output has been stored in the last output memory 112. The present limit is stored in circuit 102 and is connected via a sign applying circuit 114 to the gate 108. The correct sign for the limit to be applied is received from lead 95a of the negative dI circuit 95 or the lead 96a of the positive dI circuit 96. Upon receipt of a signal from lead 106a of the comparison circuit 106, the gate 108 is opened to pass the last output stored in circuit 112 and the present limit stored in circuit 102 to a math unit 110 wherein the limit is added to or subtracted from the last output value in accordance with the sign applied by circuit 114. The math unit 110 then delivers a resultant filtered signal to output terminal 99.

If the negative dI is bigger than the minimum limit, a signal is also delivered on lead 106a to a gate 120 which gates the present limit from memory circuit 102 to an increasing circuit 122. The increasing circuit 122 may be a multiplier circuit wherein the present limit stored in memory unit 102 is multiplied, for example by two, to double the present limit. However, it should be noted that the increasing circuit may operate either geometrically or arithmetically and may multiply or add to the present limit to increase the present limit. After the increase by circuit 122, the increased present limit is stored temporarily in the store next limit circuit 126 and is passed through a delay circuit 124 back to and restored in the present limit memory 102. The delay circuit 124 enables the filter to finish its operations with the previous present limit and to provide a filtered output at the terminal 99.

If the negative dI is smaller than the minimum limit and so noted in comparison circuit 106, an output appears on lead 106b which is directed to lead 98c of the raw input gate 98 and, in conjunction with a gate signal received from circuit 84, indicates that the raw input as delivered to terminal 78 is to be gated directly to the output terminal 99.

If the direction detection unit has indicated that the sign of the preceding change was the same, then an output is delivered on lead 93a to an AND gate 136. A coincidence of signals on leads 93a and 95a gates the negative dI magnitude to a comparison circuit 138 where it is compared with the magnitude of the present limit from the memory circuit 102. If the negative dI quantity is bigger than the present limit, a signal appears on lead 138a which is operative to open gate 108 to allow the value of the last output from memory 112 plus the magnitude of the present limit with the correct sign applied to be gated to math unit 110 and eventually appear at output terminal 99 as described hereinbefore. In addition, the signal on lead 138a opens gate 120 to pass the magnitude of the present limit from memory circuit 102 through the increasing circuit 122 to provide a larger limit for future comparison. The larger limit is restored in memory 102 via the store next limit circuit 126 and the delay circuit 124 as described hereinbefore.

If in comparing the present limit, and the present negative dI change in circuit 138, the negative dI change is not as large as the limit, a signal appears on lead 138b which is operative to open gate 134 and allow the magnitude of the present limit from memory 102 to be compared in circuit 132 with the magnitude of the minimum limit from circuit 101.

If the comparison in circuit 132 indicates that the magnitude of the present limit is equal to or less than that of the minimum limit, a signal is delivered on lead 132a to lead 98d of the raw input gate 98 gating the raw input from terminal 78 to output terminal 99. If the comparison circuit 132 indicates that the present limit is not equal and is larger than the minimum limit, a signal appears on lead 132b which opens gate 116 and gates the value of the present limit from memory circuit 102 to a reducing circuit 118. For purposes of this example, it will be considered that the reducing circuit 118 is a dividing circuit which halves the value of the present limit. However, as was the case with the increasing circuit 122, the reducing circuit 118 may be a dividing or an arithmetic subtraction unit which will decrease the value of the present limit. Assuming that the reducing circuit 118 divides the present limit by two, the halved magnitude is directed to comparison circuit 130 where it is again compared with the magnitude of the minimum limit. If the halved magnitude of the present limit is less than the magnitude of the minimum limit, a signal appears on lead 130a which connects through lead 100b and gates the value of the minimum limit to the memory unit 102 to bring the magnitude of the stored present limit back up to that of the minimum limit. If the comparison circuit 130 indicates that the present limit is not less than the minimum limit, a signal appears on lead 130b to open gate 128 to allow the just reduced or halved value of the present limit available from the reducing circuit 118 to be stored in the store next limit circuit 126. The next limit is then passed through the delay circuit 124 and stored as the present limit in memory 102, for application on the next sampling cycle.

Figure 4:
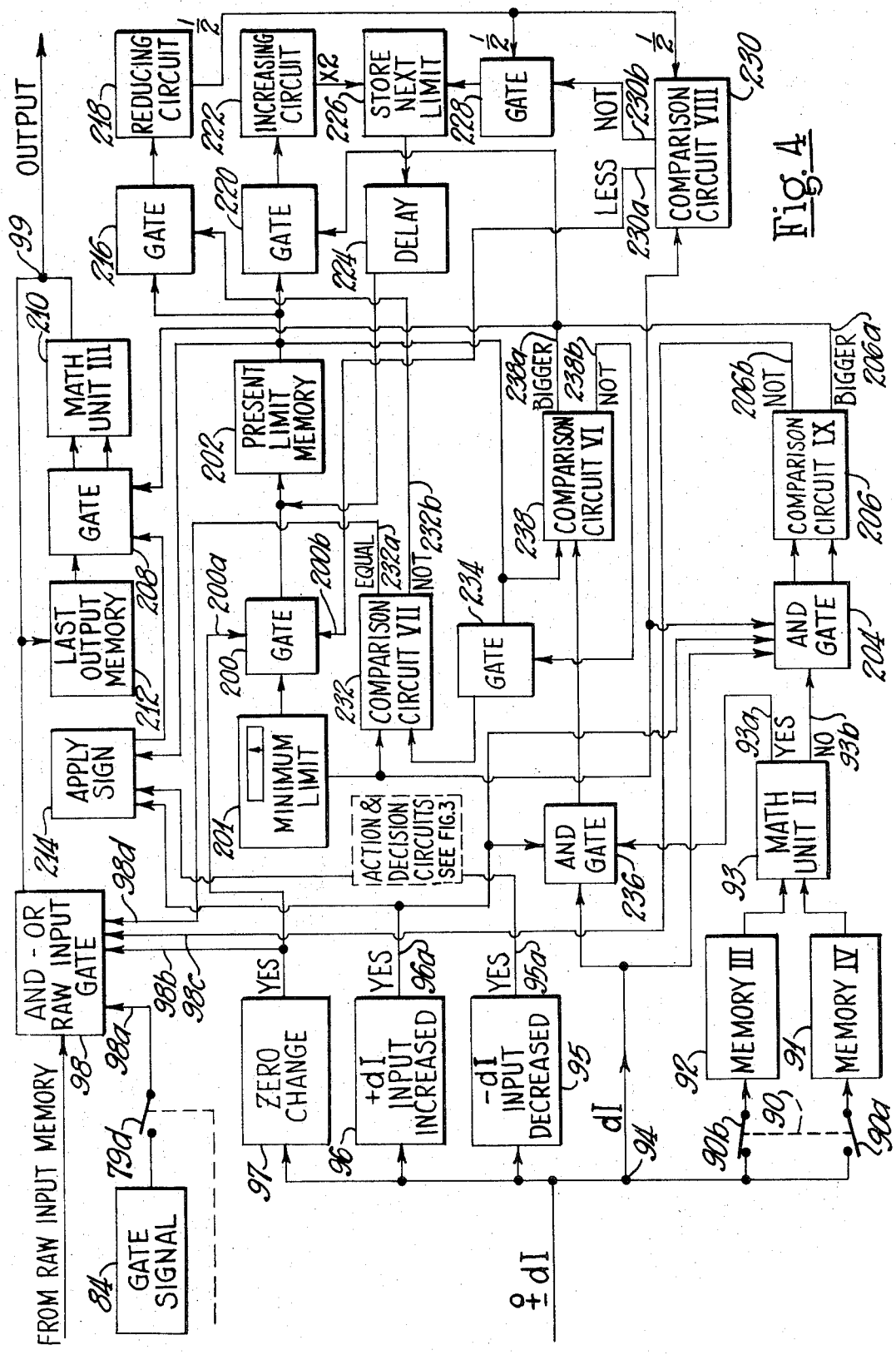
FIG. 4 is a block circuit diagram of apparatus for applying limits to signals which are increasing.

Referring to FIG. 4, there is illustrated a circuit for applying a limit to an increasing raw input signal. A different minimum limit circuit 201 may be utilized to apply a limit of a different magnitude for use with an increasing signal than the magnitude of the limit applied to the decreasing signal in FIG. 3. Similarly, circuits shown throughout FIG. 4 have functions which may be or are identical to those shown in FIG. 3. If the limits are to be the same and if the same action is desired, it is obvious that some of the circuits of FIG. 3 and FIG. 4 may be combined to provide the functions required for both the increasing and the decreasing signals. However, for purposes of clarity, the increasing signal circuit of FIG. 4 and the decreasing signal circuit of FIG. 3 have components shown separately to illustrate the operation in response to the increasing and decreasing signals.

As with the circuit shown in FIG. 3, a zero change provides an output from the zero change circuit 97 to lead 98b which gates the raw input from terminal 78 through gate 98 to the output terminal 99. In addition, the output from zero change circuit 97 is received by lead 200a of OR gate 200 and gates the minimum limit as set by circuit 201 to the present limit memory 202.

When the positive dI change is received from terminal 94, an output appears on lead 96a of the positive dI or input increase circuit 96. The direction detection circuit provides outputs on leads 93a and 93b if the direction of the previous change was or was not the same, respectively. If the change was not in the same direction as the previous change, the AND gate 204 receives a coincidence of signals from leads 96a and 93b gating the magnitude of the minimum limit from circuit 201 to circuit 206 for comparison with the magnitude of the positive dI change received from terminal 94.

If the magnitude of the positive dI change is larger than that of the minimum limit, a signal is delivered on lead 206a to gate 208. The last output, as stored in the last output memory 212, is gated through circuit 208 to a math unit 210 along with the value of the present limit from memory 202 with the correct sign as applied by circuit 214 as described hereinbefore. The combined values of the present limit and the last output then appear at the output terminal 99. In addition, the output appearing on lead 206a is operative to open gate 220 to pass the magnitude of the present limit from memory 202 to an increasing circuit 222. In the manner described hereinbefore with respect to FIG. 3, the increasing circuit 222 geometrically or arithmetically increases the present limit to a new value, in this instance assumed to be twice the present limit. The twice present limit is stored in the store next limit circuit 226 and, after a delay afforded by circuits 224, is stored in the present limit memory 202 for use in the next series of comparisons.

If the comparison circuit 206 indicates that the value of the positive dI change received at terminal 94 is not bigger than the minimum limit, then a signal appears on 206b which provides a gating signal through lead 98c to gate the raw input from terminal 78 through gate 98 to the output terminal 99.

If the preceding change were of the same sign as the present positive change, a coincidence of inputs is received by AND gate 236 from leads 96a and 93a gating the magnitude of the present positive dI change to circuit 238 where it is compared with the magnitude of the present limit from the memory circuit 202. If the present positive change value is bigger than the present positive limit, an output appears on lead 238a which is operative to open gate 208 in the manner that has been hereinbefore described to provide a filtered output at terminal 99, i.e., the value of the last previous output plus the value of the present positive limit. In addition, the signal appearing on lead 238a is operative to open gate 220 to pass the magnitude of the present limit from memory 202 to an increasing circuit 222. In the manner described hereinbefore, the increasing circuit 222 geometrically or arithmetically increases the present limit to a new value, in this instance assumed to be twice the present limit. The twice present limit is stored in the store next limit circuit 226 and, after a delay afforded by circuit 224, is stored in the present limit memory 202 for use in the next series of comparisons.

If the present dI change is not bigger than the present limit, an output appears on lead 238b which opens gate 234 to allow the magnitude of the present limit from memory 202 to be compared with the magnitude of the minimum limit from circuit 201 in comparison circuit 232. If the present limit is equal to or less than the minimum limit, a signal appears on lead 232a which opens gate 98 via lead 98d and allows the raw input signal from terminal 78 to pass to the output terminal 99. If the present limit is not equal to and is larger than the minimum limit, an output appears on lead 232b which opens gate 216 passing the magnitude of the present limit from memory 202 through gate 216 to a reducing circuit 218. As described hereinbefore with respect to FIG. 3, circuit 218 reduces the magnitude of the present limit by some predetermined value, in this instance assumed to be one-half. The halved magnitude of the present limit is then compared with the magnitude of the minimum limit in circuit 230. If the magnitude of the halved present limit is not less than the minimum limit, a signal appears on lead 230b which opens gate 228 to allow the halved present limit to be stored in the store next limit circuit 226. After a suitable delay afforded by the delay circuit 224, this "half" present limit is stored in memory 202 for use as the next limit. If the magnitude of the half present limit is less than the minimum limit, an output appears on lead 230a to open the OR gate 200 to allow the minimum limit to be stored in the present limit memory 202 for use as the next limit.

Figure 5:
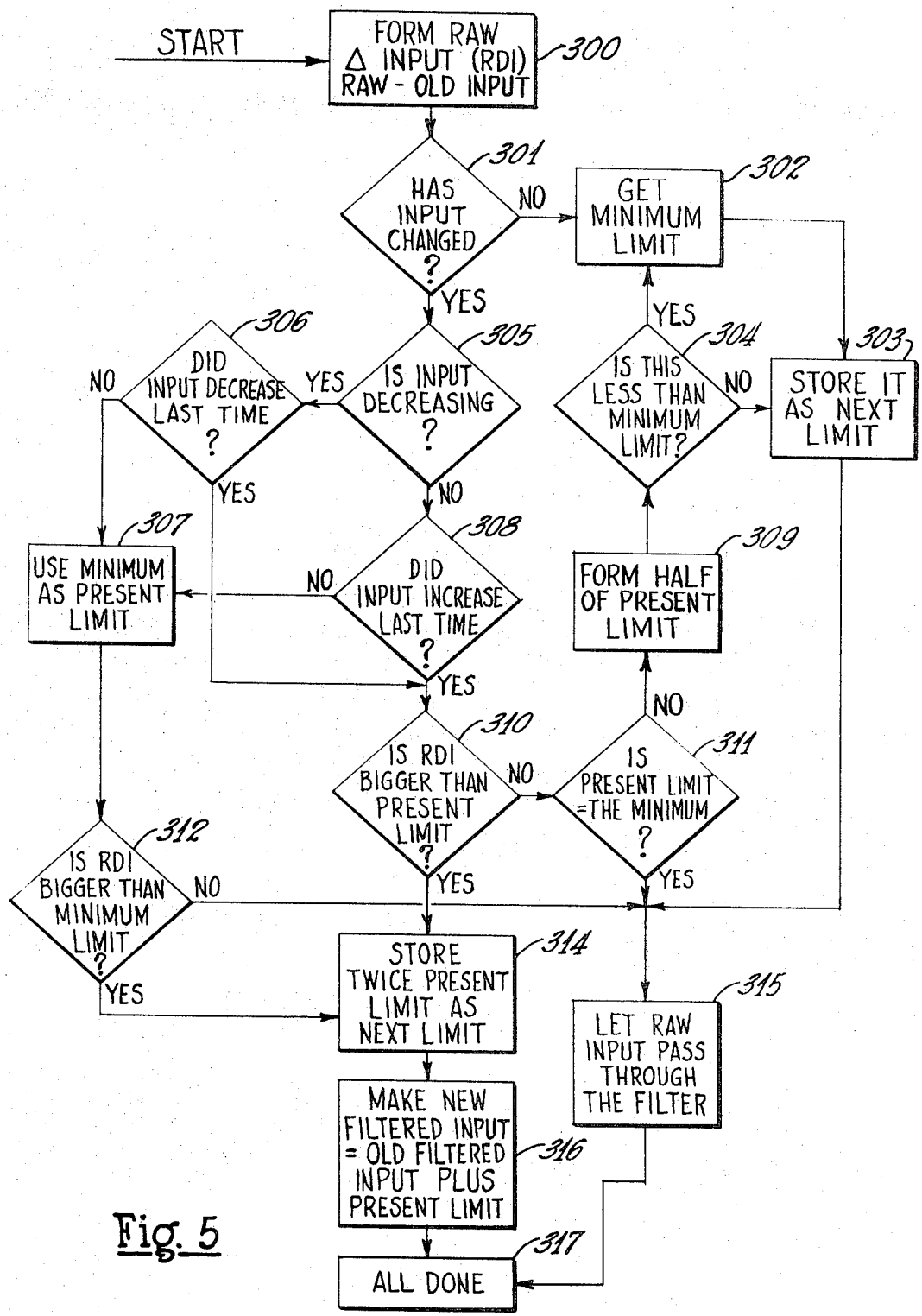
FIG. 5 is a logic diagram for constructing apparatus according to the teachings of this invention.

Referring to FIG. 5, there is illustrated a logic diagram which sets forth the method of this invention and which may be utilized in the construction of a digital input filter in which the limit is doubled in response to successive changes in the same direction of the input signal. The logic diagram of FIG. 5 may also be utilized to construct an analog input filter in which various input limit gates are selected in response to decisions made by logic circuits. In setting forth the sequence of the logic of FIG. 5 it will be assumed that a steady input has appeared at the filter for past readings. The rectangular blocks indicate an action logic circuit while the diamond-shaped blocks indicate a decision logic circuit.

A "first" input is received by the logic block 300 and a raw delta input change is formed, which is the difference between a previously sampled input and the presently sampled first input.

Assume that the magnitudes of the first input and the "next previous" input were equal. Therefore, the input has not changed. Logic block 301 makes a decision to get the minimum limit via logic block 302 and store it as limit for the next input via logic block 303. In addition logic block 315 allows the raw first input to be passed through to the output of the filter and the filter logic is all done as indicated by block 317.

Assume that the magnitude is increasing. Logic block 308 decides if the previous reading increased last time. Since we have assumed that it didn't, the minimum positive limit is used in response to action by logic block 307. Logic block 312 compares the first input increase with the minimum positive limit. If larger, then twice the minimum positive limit is stored by the action of logic block 314 as the next limit and the last output of the filter plus the present positive limit is passed to the output of the filter by action of logic block 316. If smaller than the minimum positive limit, then the raw first increasing input is passed to the output of the filter by action of block 315.

Assume that the magnitude of the first input is decreasing. Logic block 305 causes logic block 306 to decide if the magnitude of the previous reading decreased. Since it was assumed not to in this instance, the minimum negative limit is used as the present limit by the action of logic block 307. The decision block 312 then compares the magnitude of the decrease with the minimum negative limit. If it is larger, then twice the minimum negative limit is stored as the next limit by block 314, and the first decreasing input is chopped at the minimum limit by action block 316. If the decrease is smaller than the minimum negative limit then the raw decreasing first input is passed to the filter output by action of block 315.

After the filter is all done with the above sequence the memory is cleared of the next previous reading, retains the first input, and samples and stores the "second" input of the sequence. The magnitudes of the second and first inputs are compared. If the magnitudes are equal, decision block 301 notifies action block 302 to get and store the minimum positive and negative limits as limits for the next input via action block 303. Action block 315 passes the raw second input signal through to the output.

If the magnitude is increasing, decision block 308 checks to see if the magnitude of the first input increased last time. If it did not, or if it actually decreased, then the minimum limit is applied as described hereinbefore. If, however, the magnitude of the first input did increase last time, then decision block 310 compares to see if the present increase is larger than the present limit. If it is larger, then twice the present limit is stored via the action block 314 as the next limit and action block 316 passes the last filtered output plus the present limit. If the increase is less than the present limit decision block 311 compares to see if the present limit is equal to the minimum limit. If so, the raw second input is passed to the output by action block 315. If the present limit is not equal to the minimum limit then action block 309 divides the present by two. If this one-half present limit is equal to or less than the minimum limit then the decision block 304 gets the minimum limit and stores it as the next limit via action blocks 302 and 303. If this one-half present limit is not less than the minimum limit then the one-half present limit is stored as the next limit by action block 303.

If the magnitude of the second input is decreasing then decision bock 306 checks to see if the first input decreased last time. If it did not then the minimum negative limit is used as the present limit, and the decrease of the second input is compared with the minimum limit by decision block 312. If the decrease of the second input is larger, then twice the present limit is stored as the next limit by action circuit 314. If the decrease of the second input is equal to or less than the minimum limit, then the raw second input is passed to the output means by action block 315.

If the first input did decrease last time, then decision block 310 compares to see if the decrease is bigger than the present limit. If it is larger, then action block 314 stores twice the present negative limi as the next negative limit and passes the last filtered input plus the present limit. If it is not, then the present limit is compared in decision block 311 to see if it is equal to the minimum limit. If so, then the raw second decreasing input is passed to the output by action block 315. If the present negative limit is not equal to the minimum limit then action block 309 divides the present negative limit by two. Decision block 304 compares the one-half negative limit to the minimum negative limit. If the one-half limit is less, then action blocks 302 and 303 get and store the minimum limit. If the one-half limit is not less, then action block 303 stores the one-half limit as the next limit to be used.

The action and decision logic blocks set forth in the logic diagram of FIG. 5 may thus compare successive inputs and provide an increased or decreased limit and pass the filtered signal to the output means. The action and decision blocks double or halve the limit as necessary to severely limit transients and to allow real signal changes through.

Figure 6:
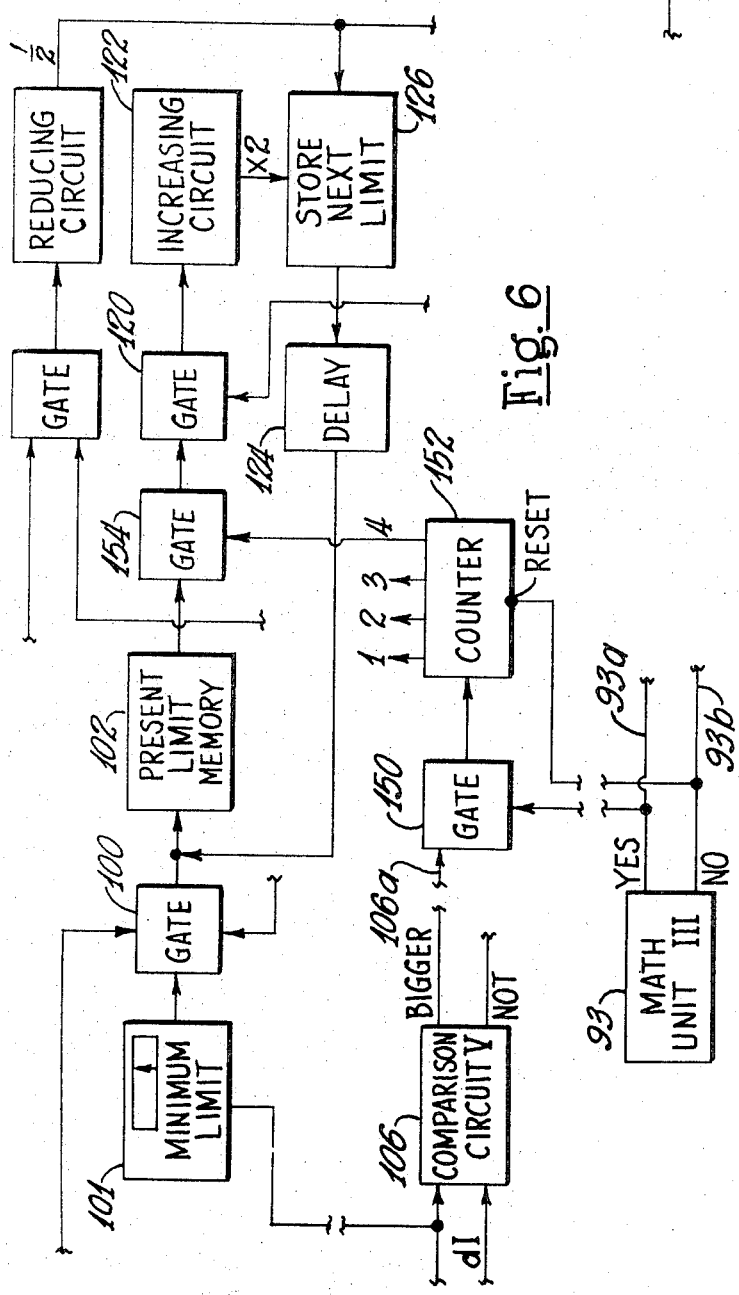
FIG. 6 is a block circuit diagram of apparatus for applying a minimum limit a plurality of times.

Referring to FIG. 6 there is illustrated a circuit suitable for use with the circuits of FIG. 3 or FIG. 4 to provide that the minimum limit is applied a predetermined number of times before the filter limits are allowed to open to pass a real input change. An additional gate circuit 150 is connected to pass a signal from comparison circuit 106 noting that the change is larger than the minimum limit to a counter 152 via lead 106a. Gate 150 is opened in response to a signal on lead 93a from math unit 93 which indicates that the sign of the preceding change was the same and thus that the input is successively increasing or decreasing. A further additional gate 154 is connected between the present limit memory 102 and the gate 120.

In response to successive signals from lead 106a of a change in the input in the same direction, the gate 150 is opened. Counter 152 receives the successive signals and counts them up to the number of applications of the minimum limit desired. In the present instance the counter is allowed to count four successive changes that are larger than the minimum limit. When the fourth change is noted by the counter 152 a signal is delivered to gate 154 which allows the present limit memory to be gated through gate 120 for a geometrically or arithmetically increasing operation by circuit 122 as hereinbefore described.

Thus the circuit of FIG. 6 determines that a predetermined number of successive increases, which increases are larger than the minimum limit, must occur before the minimum limit is increased. If it is desired to detect only increases which may or may not be larger than the minimum limit but which are successive changes in the same direction, the gate 150 may be removed and the lead 93a connected directly to the counter 152. This reads successive changes as desired but does not indicate the magnitude of the change. A signal from 93b may be utilized to reset the counter 152 whenever the signal changes direction.

Figure 7:
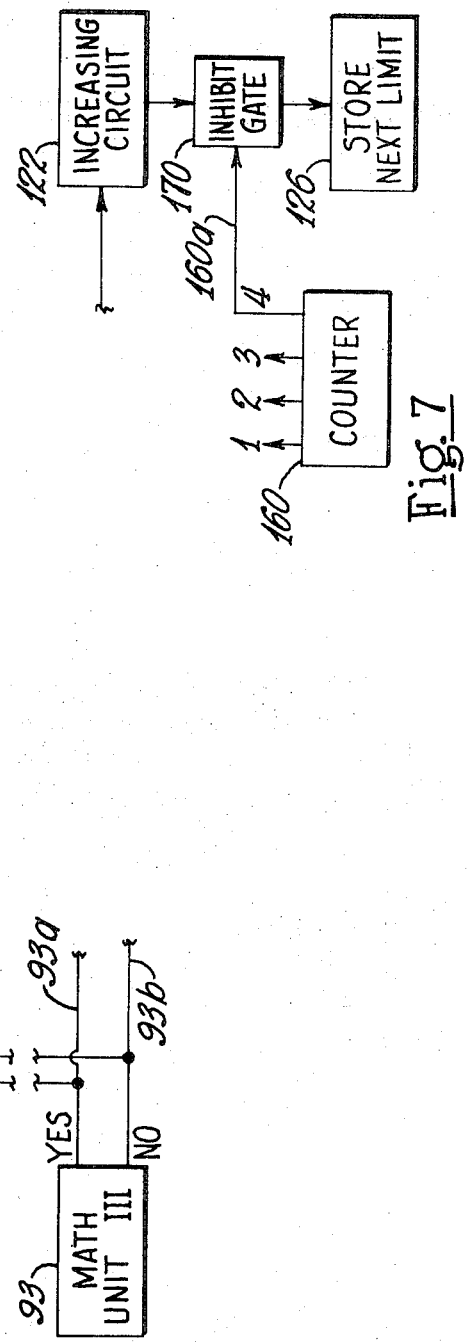
FIG. 7 is a block circuit diagram of apparatus for providing a maximum limit to be applied to an electrical signal.

Referring to FIG. 7 there is illustrated a circuit for applying a maximum limit to the filter. A counter 160 may be connected to receive inputs from 93a, or from 106a via a gate as set forth in FIG. 6. After the counter 160 has counted the number of increases desired to obtain a maximum limit an output on lead 160a is forwarded to an inhibit gate circuit 170 which is disposed between the increasing circuit 122 and the store next limit circuit 126. This will prevent further increases in the limit from being applied and stored in the present limit memory 102. The counter 160 may be reset in a manner similar to that shown in FIG. 6

There has thus been described filter apparatus comprising means for receiving a raw input signal, output means for delivering a filtered resultant signal and means for successively sampling the raw input signal. Means are provided for measuring the magnitude of change of successive samples. Means for detecting and comparing the direction of change of successive samples is adapted to provide a first signal in response to successive changes in the same direction and a second signal in response to different directions of change. First means responsive to the second signal may be utilized for comparing the magnitude of a change with a predetermined minimum limit and providing a third signal in response to a magnitude in excess of the minimum limit and a fourth signal in response to a lesser magnitude. Means have been provided responsive to the third signal for passing the raw input signal up to the minimum limit to the output means and for setting a predetermined increased present limit for future comparisons. Second means are shown responsive to the first signal for comparing the magnitude of a change with the predetermined present limit and providing a fifth signal in response to a magnitude in excess of the present limit and a sixth signal in response to a lesser magnitude. Means are further provided which are responsive to the fifth signal for passing the raw input signal up to the present limit to the output means, and for inceasing the present limit to a predetermined larger value for future comparisons. Third means are shown which are responsive to the sixth signal for comparing the present to the minimum limit and for reducing the present limit to a predetermined lower value not less than the minimum limit if the present limit exceeds the minimum limit. Finally, means are provided responsive to any one of the fourth signal, the sixth signal, and to no change at all in successive samples for passing a raw input signal to the output means.

The above apparatus is operative to carry out the methods of this invention for filtering transients and other noise from electrical signals which comprises the steps of successively measuring the signal, passing each measured signal if no change has occurred, detecting the directiono of change of the signal, passing the signal up to a predetermined minimum limit if the signal changes direction, and successively increasing the limit if the signal successively changes in the same direction while passing the signal up to the limit presently being applied. The method may further include the steps of comparing the present limit with the amount of change at each measurement, increasing the present limit if the change is larger, and decreasing the present limit if the change is smaller.

In addition to the novel filter apparatus disclosed and described hereinbefore, it should be noted that the novel combination of the fiber producing equipment with the filter apparatus provides uniform fibers not attainable heretofore. Further, the use of the equipment shown herein enables the coordination of programs for controlling the linear speed of attenuation and the temperature of the feeder and thus the temperature of the glass to gain more exact diameter control. Referring again to FIG. 1, it will be noted that the control processing unit 60 contains program comparison sections I and II. The program comparison sections may be operated separately, each controlling one of the functions, or may be operated in conjunction with each other as noted by cross connections 61 and 62 to provide coarse and fine adjustments as discussed.

The program comparison units I and II may be made to take over the process control in response to a predetermined condition such as input signal failure, measuring or sensor failure, or other erratic and undesirable happenings that would make the process difficult to control. Signal sensor 63 is connected to enable one program to become dominant and exclude the remaining program in response to erratic behavior on either input side of the process.

The invention thus also features apparatus for producing continuous fibers from a supply of heat-softened material comprising a feeder adapted to contain a supply of the material and having a plurality of orifices formed therein for supplying a like plurality of streams of the material. Means are provided for heating the feeder. Rotatable collet means attenuates the streams into fibers and winds the fibers onto a package. A winder motor drives the collet. Means are provided for controlling separately, or in conjunction or coordination with each other, the heating means and driving means. The control means includes means for sensing the temperature of the feeder to provide a first signal proportional thereto and means for sensing the linear speed of attenuation and providing a second signal, also proportional. Filter apparatus described hereinbefore is operative to filter either the first signal, the second signal, or both to provide the improved results.

A novel method for producing fibers is also described which comprises the steps of heating a feeder containing the material, attenuating streams of the material into fibers, controlling the amount of heat supplied to the feeder, controlling the linear speed of attenuation, and coordinating the steps of heat controlling and speed controlling to produce a plurality of fibers having the same diameter wherein each fiber has a uniform diameter throughout its length.

In conclusion, it should be noted that variations to the apparatus shown in this invention may be made to attain the desired method or results. The embodiments disclosed and described herein are meant to be illustrative only and not limting in any sense. The embodiments described serve merely to illustrate the spirit and scope of the invention.

I claim:

1. The method of operating an automatic computing system to reduce transients and other noise in a series of signals, comprising
   a. placing a value in storage which represents a limit of change in magnitude for a signal;
   b. successively receiving and filtering a series of signals by limiting the change in magnitude of each signal to the stored change limit value, and successively outputting the resultant filtered signals;
   c. comparing successively received signals to detect the amount and direction of change in magnitude between successive signals; and
   d. increasing the value of said stored change limit in response to the detection of a change in magnitude in the same direction between successive signals which is in excess of the then stored change limit value.

2. The method as defined in claim 1 which further includes increasing the value of said stored change limit in steps of predetermined amounts as corresponding changes in the same direction are detected.

3. The method as defined in claim 1 which further includes
   a. comparing the present stored change limit value with a presently detected magnitude of change between successive signals,
   b. increasing the value of the stored change limit for a succeeding signal if the presently detected magnitude of change is greater than the presently stored value, and
   c. decreasing the value of the stored change limit for a succeeding signal if the presently detected magnitude of change is less than the presently stored value.

4. A method as defined in claim 3 which further includes the step of providing a minimum value below which th stored change limit cannot be reduced.

5. A method as defined in claim 3 which further includes the step of providing a maximum value above which the stored change limit cannot be increased.

6. The method as defined in claim 3 in which the value of said stored change limit is increased and decreased arithmetically.

7. The method as defined in claim 3 in which the value of said stored change limit is increased and decreased geometrically.

8. A method of conditioning an electrical signal comprising the steps of measuring successive changes in said electrical signal, detecting the direction of said changes, limiting a first change in one direction to a predetermined minimum amount, and increasing the limit from said minimum limit amount in predetermined steps as corresponding successive changes in the same direction occur.

9. A method as defined in claim 8 which further includes the steps of comparing the present limit step with the corresponding present change, increasing said present limit if the corresponding change is larger, and decreasing the present limit if the corresponding change is smaller, 10. A method as defined in claim 9 in which is included the further steps of comparing said present limit with said minimum limit if said corresponding change is smaller than said present limit, decreasing said present limit if said present limit is larger than said minimum limit, and using said minimum limit as the next limit to be applied if said present limit does not exceed said minimum limit.

11. A method as defined in claim 8 which further includes the step of comparing a corresponding change with said minimum limit, increasing said minimum limit if said corresponding change exceeds said minimum limit, and using said minimum limit as the next limit if said corresponding change does not exceed said minimum limit.

12. A method as defined in claim 8 which further includes the step of applying said minimum limit a plurality of times to successive changes in one direction of said electrical signal before increasing said minimum limit amount in said predetermined steps.

13. A method as defined in claim 8 which further includes the step of providing a maximum limit which may not be exceeded.

14. A method as defined in claim 8 which further includes the step of increasing said minimum limit amount in first predetermined steps for an increasing electrical signal and in second predetermined steps which differ from said first steps for a decreasing electrical signal.

15. A method of conditioning an electrical signal comprising the steps of successively measuring said signal, passing each measured signal if no change has occurred, detecting the direction of change of said signal, passing said signal up to a predetermined minimum limit if said signal changed direction, successively increasing said limit if said signal successively changes in the same direction and passing said signal up to the limit presently being applied.

16. A method as defined in claim 15 which further includes the step of comparing the present limit with the amount of change at each measurement, increasing said present limit if said change is larger, and decreasing said present limit if said change is smaller.

17. Automatic computing apparatus comprising means for receiving an input signal, output means for delivering a filtered resultant signal, means responsive only to said input signal means for detecting successive changes in said input signal in one direction, means responsive to said change detecting means for limiting said changes passed to said output means to predetermined small amounts initially, and means responsive to said change detecting means for increasing the change limit of said change limiting means in response to sustained successive changes in said input signal in said one direction.

18. Apparatus for reducing transients and other noise in a signal comprising means for receiving an input signal, output means, gating means connecting said input and output means, means for comparing the magnitude of successive input signals received at said input means, and means responsive to said comparing means for setting a predetermined limit on the magnitude of change of said input signal passed by said gating means to said output means, said limit setting means increasing the magnitude of the limit set in response to a continuing change in the same direction of successive input signals detected by said comparing means.

19. Apparatus for reducing transients and other noise in a signal comparing means for receiving a raw input signal, means responsive to said receiving means for measuring a change in said input signal, first means responsive to said input signal change measuring means for comparing said input signal change to a predetermied present change limit, means responsive to said first comparing means for passing said raw input signal when said measured input signal change is less than said present change limit, means responsive to said first comparing means for passing said input signal up to said present change limit and for increasing said present change limit to a second predetermined value for future comparison when said input signal change exceeds said present change limit, means responsive to said receiving means for detecting the direction of change of said input signal, means responsive to said direction detecting means for limiting the change in said input signal to a predetermined minimum change limit when said input signal changes direction, and second means responsive to said first comparison means for comparing said present change limit to said minimum change limit when said input signal change is less than said present change limit and for reducing said present change limit to another predetermined value not less than said minimum change limit for future comparison.

20. Apparatus for reducing transients and other noise in a signal comprising means for receiving a raw input signal, output means for delivering a filtered resultant signal, means connected to said receiving means for successively sampling said raw input signal and for measuring the magnitude of input signal change of successive samples, means connected to said receiving means for detecting and comparing the direction of input signal change of successive samples and providing a first signal in response to successive input signal changes in the same direction and a second signal in response to different directions of input signal change, first means responsive to said second signal for comparing the magnitude of an input signal change with a predetermined minimum change limit and providing a third signal in response to a magnitude of input signal change in excess of said minimum change limit and a fourth signal in response to a magnitude of input signal change less than said minimum change limit, means responsive to said third signal for passing said raw input signal up to said minimum change limit to said output means and for setting a predetermined increased present change limit for future comparison, second means responsive to said first signal for comparing the magnitude of an input signal change with said predetermined present change limit and providing a fifth signal in response to an input signal change magnitude in excess of said present change limit and a sixth signal in response to a magnitude of input signal change less than said present change limit, means responsive to said fifth signal for passing the raw input signal up to the present change limit to said output means and for increasing said present change limit to a predetermined larger value for future comparison, third means responsive to said sixth signal for comparing said present change limit to said minimum change limit and for reducing said present change limit to a predetermined lower value not less than said minimum change limit if said present change limit exceeds said minimum change limit, and means responsive to any one of said fourth signal, sixth signal, and to no input signal change in successive samples for passing a raw input signal to said output means.

21. Apparatus as defined in claim 20 which further includes means responsive to said detecting and comparing means for applying said minimum change limit a plurality of times to successive input signal changes in the same direction of said raw input signal before increasing the change limit.

22. Apparatus as defined in claim 20 which further includes means responsive to a plurality of successive input signal changes in the same direction which exceed said minimum change limit for applying said minimum change limit a plurality of times to said input signal.

23. Apparatus as defined in claim 20 which further includes means for setting a maximum change limit to be applied to said input signal.

24. Apparatus as defined in claim 20 in which said change limit is increased geometrically.

25. Apparatus as defined in claim 20 in which said change limit is increased arithmetically.

26. Apparatus as defined in claim 20 in which said change limit is increased at a first rate for increasing input signals and at a second rate for decreasing input signals.

* * * * *